United States Patent [19]

Zibrida

[11] Patent Number: 4,689,156

[45] Date of Patent: Aug. 25, 1987

[54] REMOVAL OF AMMONIA FROM WASTEWATER

[75] Inventor: John F. Zibrida, St. Petersburg, Fla.

[73] Assignee: AMAX Inc., Greenwich, Conn.

[21] Appl. No.: 796,824

[22] Filed: Nov. 12, 1985

[51] Int. Cl.$^4$ .............................................. C02F 1/20
[52] U.S. Cl. ................................... 210/747; 210/750; 210/766; 210/903
[58] Field of Search ............... 210/750, 631, 718, 737, 210/766, 903, 747, 742, 743

[56] References Cited

U.S. PATENT DOCUMENTS

| | | | |
|---|---|---|---|
| 4,045,341 | 8/1977 | Tsuruta et al. | 210/903 X |
| 4,076,515 | 2/1978 | Rickard | 210/631 X |
| 4,093,544 | 6/1978 | Ross | 210/718 X |
| 4,160,725 | 7/1979 | Josis et al. | 210/750 X |
| 4,311,597 | 1/1982 | Bhattacharyya | 210/750 X |
| 4,345,975 | 8/1982 | Abe et al. | 210/737 X |
| 4,559,210 | 12/1985 | Diemer et al. | 210/750 X |

*Primary Examiner*—Tom Wyse
*Attorney, Agent, or Firm*—Michael A. Ciomek; Eugene J. Kalil

[57] ABSTRACT

A method is provided for removing ammonia from wastewater containing in excess of about 15 ppm NH$_3$(N)-T. The method comprises treating the wastewater with an alkaline reagent selected from the group consisting of lime and caustic sufficient to raise the pH to provide a free ammonia equivalence (FAE) to a value of at least about 12.4, the free ammonia equivalence being determined as follows:

$$FAE = pH + (\theta/15)^{0.5}$$

wherein pH is the pH value of the treated wastewater and $\theta$ is the temperature of the wastewater in degrees Fahrenheit. The treated wastewater is gas-stripped to lower the total ammonia content of the treated wastewater to a value of less than about 10 ppm NH$_3$(N)-T, the gas stripping being controlled to maintain the free ammonia equivalence of the wastewater phase being stripped to a value of at least about 12.4, following which the stripped wastewater is acidified to lower the un-ionized ammonia content to less than about 0.05 ppm NH$_3$(N).

8 Claims, 3 Drawing Figures

REMOVAL OF AMMONIA FROM WASTEWATER

This invention relates to a method for treating ammonia-containing wastewater in order to minimize pollution of the environment.

STATE OF ART

In recent years the U.S. Environmental Protection Agency, including state agencies, have increased the requirements for treating wastewater, although substantial advances have been made in this field in both the domestic and industrial sectors. A requirement that has become very important is the reduction of the total ammonia [$NH_3(N)$-T] in wastewater, particularly wastewater discharged into surface waters containing fish and other forms of aquatic life. Fish are very sensitive to small amounts of un-ionized ammonia [$NH_3(N)$] in the neighborhood of less than about one part million.

Ammonia concentrations, whether total ammonia or un-ionized ammonia, are expressed on the basis of the amount of nitrogen contained in the ammonia. In order to emphasize the use of this basis of measurement, total ammonia will be symbolically expressed as "$NH_3(N)$-T" and un-ionized ammonia or free ammonia as "$NH_3(N)$".

Generally speaking, in some wastewater treatment processes, ammonia is removed following removal of other pollutants in the form of solids. The treatment employed comprises raising the pH to a level to convert the ammonia-nitrogen to free ammonia which is thereafter stripped using air in a scrubbing tower or by spraying the treated wastewater under aerating conditions into a pond. These methods have their disadvantages in that ammonia stripping does not remove all of the ammonia gas. The prior art is replete with methods for overcoming this problem. For example, in U.S. Pat. No. 4,045,341 a method is disclosed for treating wastewater containing ammonium ions, sulfate ions and organic substances. Calcium hydroxide or calcium oxide is added to the wastewater to lower the sulfate ion concentration and to liberate the ammonium ions as ammonia. The ammonia is then removed by stripping with hot air.

According to U.S. Pat. No. 4,093,544, wastewater is de-ammoniated by first increasing the pH of the water to over 10 following which a vacuum is applied to the upper surface thereof, whereby the ammonia is desorbed from the wastewater effluent. Temperature is important for achieving high conversion. Thus, at a pH of 10.5 and a temperature of 20° C., there is a 90% conversion to free ammonia.

U.S. Pat. No. 4,306,978 discloses a method for the lime stabilization of wastewater sludge. The sludge is dewatered to a solids content of about 10% to 60% by weight. Calcium oxide is then added to provide a high pH (e.g., increase it to 11) and cause a rise in temperature to 95° C.–100° C. This destroys microorganisms and also produces free ammonia which is recovered.

According to the state of the art discussed in the aforementioned U.S. Pat. No. 4,093,544, ammonia stripping of ammonia-nitrogen from wastewater has at least some theoretical advantages in that this system can treat effluent from conventional wastewater treatment equipment. Circulated air, as the stripping agent, removes a certain portion of the ammonia as free ammonia, provided the pH of the wastewater is increased to concentrate the nitrogen in the form of ammonia gas within the wastewater compared to the amount of nitrogen in the form of dissolved ammonium ions. However, ammonia stripping does not remove all of the ammonia gas.

It would be desirable to provide an improved method using known equipment wherein substantially high concentrations of ammonia of over about 15 ppm can be treated to provide removal of total ammonia in the effluent to a level not exceeding about 10 ppm and by subsequent treatment decrease the level still further to an un-ionized ammonia content of less than about 0.05 ppm and, more preferably not exceeding about 0.02 ppm.

OBJECT OF THE INVENTION

It is an object of the invention to provide an improved method for treating wastewater containing substantial amounts of ammonia to lower the total ammonia concentration to less than about 10 ppm and the un-ionized or free ammonia concentration to less than about 0.05 ppm.

Other objects of the invention will more clearly appear when taken in conjunction with the following disclosure, the appended claims and the accompanying drawings, wherein:

THE DRAWINGS

SUMMARY OF THE INVENTION

Generally speaking, the present invention relates to a method for removing ammonia from wastewater containing in excess of about 15 ppm $NH_3(N)$-T. The method comprises treating the wastewater with an alkaline material selected from the group consisting of lime and caustic sufficient to provide a free ammonia equivalence (FAE) therein of at least about 12.4, said free ammonia equivalence being determined as follows:

$$FAE = pH + (\theta/15)^{0.5}$$

wherein pH is the pH value of the treated wastewater and $\theta$ is the temperature of the wastewater in degrees Fahrenheit. Following the alkaline treatment, the method further comprises gas stripping the treated wastewater to remove ammonia therefrom, the stripping operation being controlled to maintain the free ammonia equivalence of the phase being stripped at said value of at least about 12.4 to lower the ammonia content of the treated wastewater to a value of about less than 10 ppm $NH_3(N)$-T and acidifying the wastewater depleted in ammonia to lower the un-ionized ammonia content to less than about 0.05 ppm $NH_3(N)$.

DETAILS OF THE INVENTION

Figure 1:
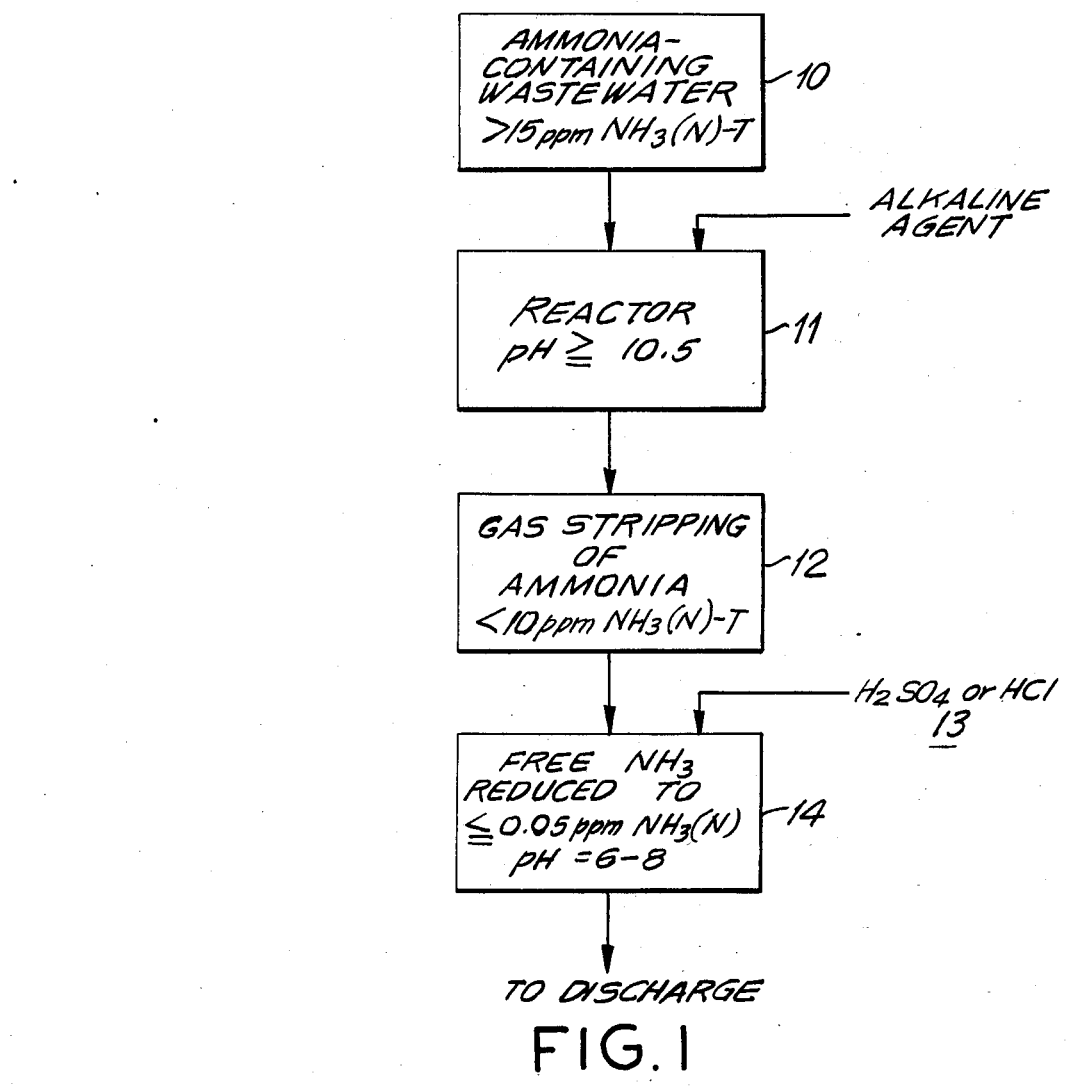
FIG. 1 illustrates one embodiment of a flow sheet for carrying out the invention.

Referring to FIG. 1, ammonia-containing wastewater 10 containing in excess of 15 ppm $NH_3(N)$-T is fed to reactor 11 to which an alkaline reagent selected for the group consisting of lime or caustic is added to provide an exit effluent having a free ammonia equivalence of at least about 12.4, advantageously above about 12.5. The free ammonia equivalence being determined as follows:

$$FAE = pH + (\theta/15)^{0.5}$$

wherein pH is the pH value of the treated wastewater and $\theta$ is the temperature of the wastewater in degrees Fahrenheit. The free ammonia equivalence enables the operator to adjust the pH value of the wastewater exiting reactor 11, for example, to at least about 10.5. However it may be lower or higher, e.g., about 10.5 to 11.5, taking into account the conditions that will be encountered during the gas stripping operation.

The effluent from reactor 11 is subjected to gas stripping at 12 to a total ammonia content of less than about 10 ppm. Gas stripping can be accomplished in spray towers, spray ponds, or by spraying gases through the treated effluent. Spray towers or spray ponds provide greater liquid-gas contact and are therefore, significantly more efficient in stripping ammonia from the wastewater. Air sparging provides less efficient liquid-gas contact and promotes carbon dioxide absorption, thereby necessitating the use of greater amounts of lime or caustic and gas handling equipment. The stripping gas can be air, excess process steam, or the products of combustion of a fuel.

Regardless of the type of gas stripping employed, it is important that the free ammonia equivalence in the phase being stripped be maintained at a value at least about 12.4. Thus, when sparging a body of wastewater, the temperature and pH of the body of wastewater must be controlled to have a free ammonia equivalence of at least about 12.4. Gas stripping techniques that employ spraying should be controlled such that the suspended droplets from the spraying operation have a free ammonia equivalence of at least about 12.4. Gas stripping by spraying can, depending upon meteorological conditions, cool the gaseous phase to such an extent that the free ammonia equivalence can drop significantly below 12.4. For example, conditions of low humidity, low temperatures, high winds, or combinations thereof can lower the temperature of the droplets in the gaseous stage by as much as 10°-15° F. or more. In order to counteract such cooling, it is advisable to add sufficient amounts of alkaline reagent to overcome any significant drop in temperature of the suspended droplets.

Heated stripping gases can be employed to provide numerous beneficial effects or to minimize the impact of uncontrollable external factors. Thus, heated stripping gases can be employed when the ambient temperature or the temperature of the wastewater falls below 15° C. Heated stripping gases can also be employed to increase the rate of stripping, which may be necessary due to the unusual weather conditions or due to space limitations that restrict the number of ponds that can be established. Heated stripping gases can also be used to insure more complete removal of un-ionized ammonia. In addition to lowering the temperature of the phase being stripped, gas stripping may also lower the pH value of the phase being stripped if the stripping gas contains acid forming constituents such as carbon dioxide, sulfur dioxides, or nitrous oxides. Precautions must be taken to maintain the free ammonia equivalence of the phase being stripped to at least about 12.4; thus additional amounts of lime or caustic can be added during stripping or, most conveniently, the initial additions of caustic or lime are sufficiently great to offset the adverse effects of acid-forming in the stripping gas.

The effluent from gas-stripping operation 12 containing less than about 10 ppm $NH_3(N)$-T is sent to acid treatment stage 14, where sufficient mineral acid or acid forming constituent (13), e.g., sulfuric acid, hydrochloric acid or carbon dioxide, is added to lower the un-ionized ammonia content to less than about 0.05 ppm $NH_3(N)$. The pH may generally range from about 6 to 8.

A brief discussion of the processes that may be employed for removing ammonia is given as follows:

Air Stripping (Towers)

Air stripping is dependent upon pH and temperature. Ammonia stripping requires raising the pH to a value of at least about 10.5 and, preferably, in the range of about 10.8-11.5, with lime or caustic.

Figure 2:
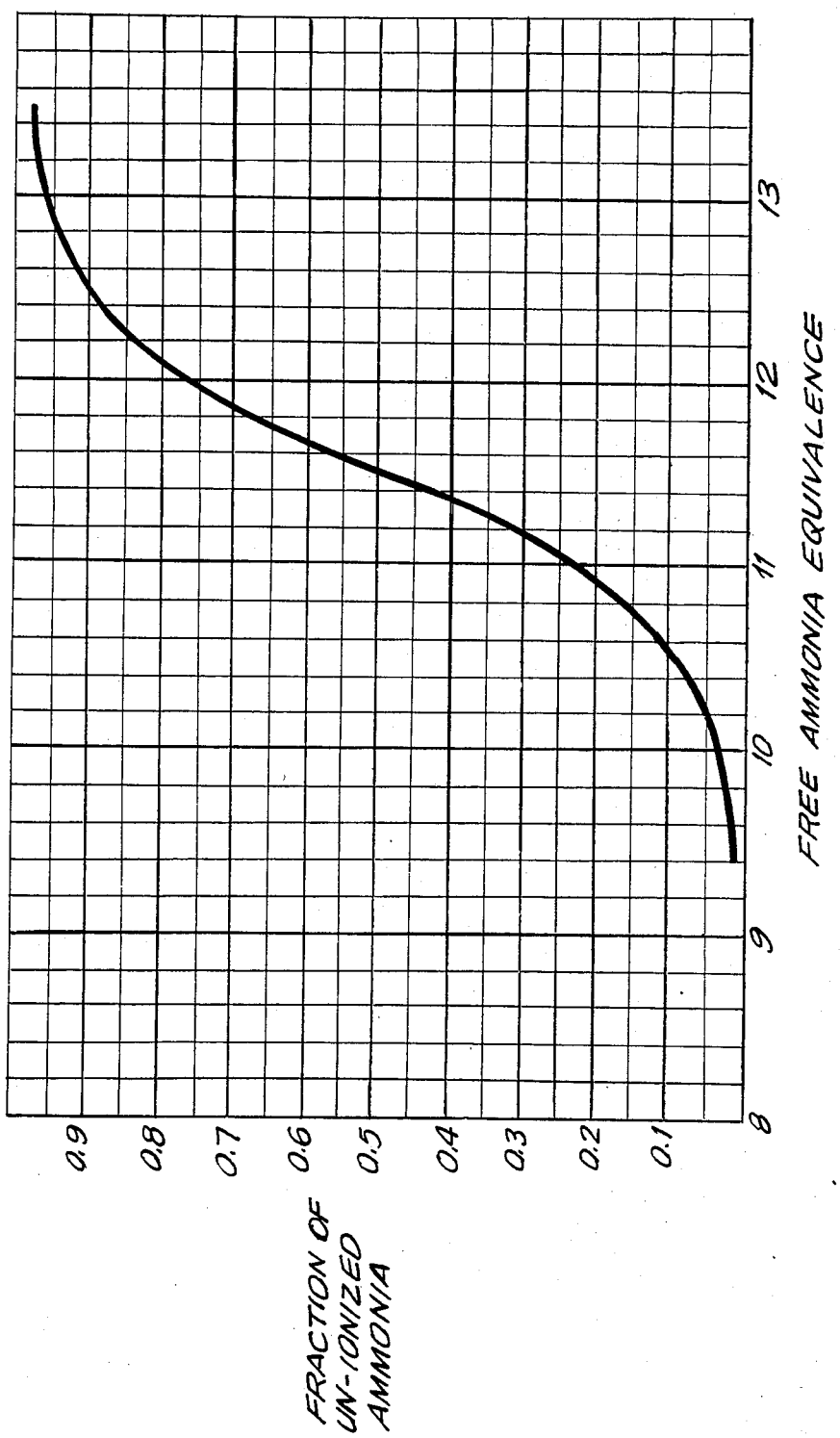
FIG. 2 is a graph which shows the effect of the free ammonia equivalence on the distribution of free un-ionized ammonia in the wastewater.

As stated above ammonia stripping consists of increasing the pH of the wastewater to provide a free ammonia equivalence of at least about 12.4 (FIG. 2) before passing the treated wastewater to the stripping tower. The formation and reformation of droplets (the phase being stripped) in the stripping tower provide increased air-water contact and droplet agitation with the passage of large quantities of air through the tower. As long as the free ammonia equivalence of the droplets is maintained at a value of at least about 12.4, the total ammonia content is readily lowered to less than about 10 ppm $NH_3(N)$-T. The stripping is preferably carried out in two or more stages.

As stated hereinbefore, the rate of ammonia gas transfer from liquid to air is influenced by pH, temperature, relative ammonia concentrations, and agitation of the air-water interface. Countercurrent towers, where air enters the bottom and exhausts from the top while water flows down through the tower packing, are generally more efficient than cross-flow units.

Pond Stripping

Pond stripping is similar to stripping in towers. The pH is adjusted to provide a free ammonia equivalence of at least about 12.4 to convert the ammonium ion to free ammonia. Un-ionized ammonia is then stripped by spraying pond water into the air to give the necessary gas/liquid transfer. Temperature is important in achieving the desired efficiency. For example, under cooler ambient conditions, the efficiency is expected to be lower. This can be compensated for by using more ponds in series, using greater air circulation, heating the water, or by employing heated spraying gases. As in tower stripping, the stripping is preferably carried out in two or more stages.

Figure 3:
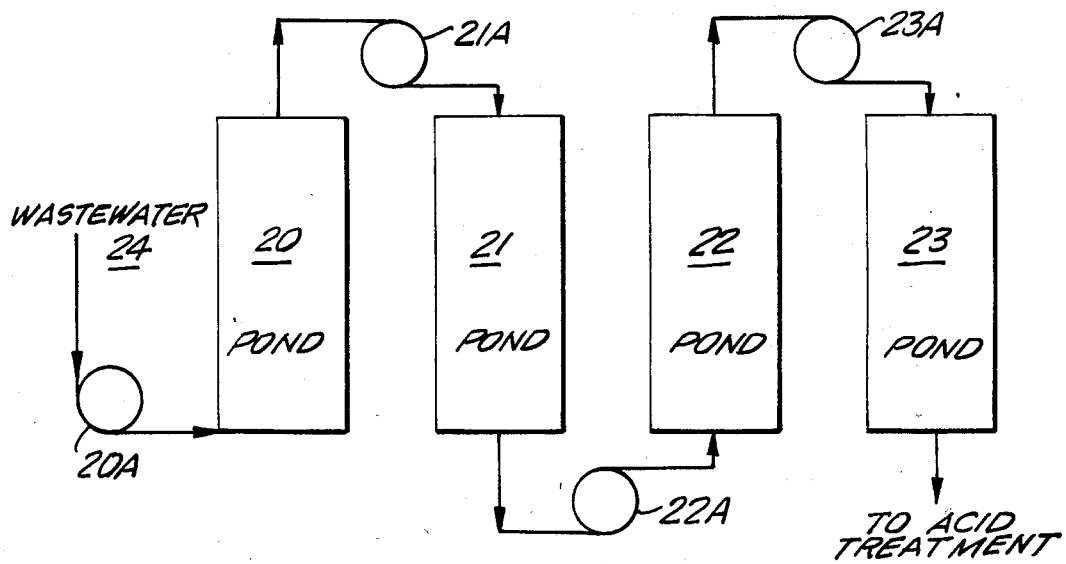
FIG. 3 depicts another embodiment illustrating the removal of ammonia from wastewater, the system comprising a series of spray ponds with spray pumps connected in series between ponds.

Advantages for pond stripping over tower stripping are low capital cost and simplicity of construction and operation. This method provides acceptable results and is not as cost intensive as other processes. The use of ponds in series (i.e., more than two stages) is illustrated in FIG. 3, the ponds being indicated by numerals 20, 21, 22 and 23. Wastewater 24 at a pH value sufficiently high to provide a free ammonia equivalence of at least about 12.4, e.g., in excess of about 12.5, is delivered to pond 20 by pump 20A, the wastewater being sprayed into the pond to effect removal of un-ionized ammonia. The water from pond 20 is removed by pump 21A and sprayed into pond 21 to remove additional ammonia, and so on, to the last pond 23 where sufficient total ammonia [$NH_3(N)$-T] is removed from the effluent to a level not exceeding about 10 ppm. In spraying wastewater from pond to pond, the conditions of spraying are controlled such that the droplets falling in the succeeding pond have a free ammonia equivalence of at least about 12.4.

Final pH Adjustment

The de-ammoniated water, whether from pond stripping or tower stripping, is then sent to acid treatment to lower the un-ionized ammonia to less than about 0.05 ppm [$NH_3(N)$], and more preferably, not exceeding about 0.02 ppm [$NH_3(N)$]. The pH may generally range from about 6 to 8.

In lowering the un-ionized ammonia to less than about 0.05 ppm, the amount of mineral acid or acid-forming constituent added should be sufficient to provide a pH value such that the free ammonia equivalence does not exceed a value determined as follows:

$$FAE = 10.2 - \log_{10} \text{ ppm } NH_3(N)\text{-}T$$

In achieving an un-ionized ammonia content not exceeding about 0.02 ppm, the amount of acid added or acid-forming constituent should be sufficient to provide a free ammonia equivalence that does not exceed a value determined as follows:

$$FAE = 9.8 - \log_{10} \text{ ppm } NH_3(N)\text{-}T$$

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for controllably removing ammonia from wastewater containing in excess of about 15 ppm $NH_3(N)$-T despite variations in ambient meteorological conditions which comprises treating the wastewater with an alkaline reagent selected from the group consisting of lime and caustic sufficient to raise the pH to provide a free ammonia equivalence (FAE) to a value of at least about 12.4, said free ammonia equivalence being determined as follows:

$$FAE = pH + (\theta/15)^{0.5}$$

wherein pH is the pH value of the treated wastewater and $\theta$ is the temperature of the wastewater in degrees Fahrenheit; gas stripping said treated wastewater to lower the total ammonia content of said treated wastewater to a value of less than about 10 ppm $NH_3(N)$-T, said gas stripping being controlled to maintain the free ammonia equivalence of the wastewater phase being stripped to a value of at least about 12.4, and acidifying the stripped wastewater to loer the un-ionized ammonia content to less than about 0.05 ppm $NH_3(N)$.

2. The method of claim 1, wherein the gas stripping of un-ionized ammonia is carried out in two or more stages.

3. The method of claim 2, wherein said two or more stages comprise spray ponds.

4. The method of claim 2, wherein said two or more stages comprise spray towers.

5. The method of claim 2, wherein the free ammonia equivalence during gas stripping is in excess of about 12.5.

6. The method of claim 1, wherein the free ammonia equivalence is maintained at a value of at least about 12.4 in the phase being stripped by using a heated stripping gas.

7. The method of claim 1, wherein the wastewater is acidified to lower the un-ionized ammonia content to less than about 0.05 ppm, the amount of acid added being sufficient to provide a pH value such that the free ammonia equivalence does not exceed that value determined as follows:

$$FAE = 10.2 - \log_{10} \text{ ppm } NH_3(N)\text{-}T.$$

8. The method of claim 7, wherein the amount of acid added to lower the un-ionized ammonia content to not more than about 0.02 ppm is that amount sufficient to provide a pH value such that the free ammonia equivalence does not exceed that value determined as follows:

$$FAE = 9.8 - \log_{10} \text{ ppm } NH_3(N)\text{-}T.$$

* * * * *